United States Patent [19]
Sim

[11] Patent Number: 5,873,597
[45] Date of Patent: Feb. 23, 1999

[54] MODULAR SENSOR UNIT CONSOLE

[75] Inventor: Vibora Sim, Farmington Hills, Mich.

[73] Assignee: Robert Bosch Corporation, Broadview, Ill.

[21] Appl. No.: 797,017

[22] Filed: Feb. 7, 1997

Related U.S. Application Data

[60] Provisional application No. 60/011,273 Feb. 7, 1996.
[51] Int. Cl.[6] .................................................. B60R 21/32
[52] U.S. Cl. ........................................ 280/735; 280/727
[58] Field of Search .................................. 280/727, 735; 701/45; 307/10.1

[56] References Cited

U.S. PATENT DOCUMENTS

| | | | |
|---|---|---|---|
| 5,080,188 | 1/1992 | Okuhara et al. | 180/282 |
| 5,366,241 | 11/1994 | Kithil | 280/735 |
| 5,439,249 | 8/1995 | Steffens, Jr. et al. | 280/735 |
| 5,482,314 | 1/1996 | Corrado et al. | 280/735 |
| 5,528,698 | 6/1996 | Kamei et al. | 382/100 |
| 5,566,974 | 10/1996 | Mazar et al. | 280/730.2 |
| 5,706,181 | 1/1998 | Dirmeyer et al. | 361/804 |

*Primary Examiner*—Christopher P. Ellis
*Attorney, Agent, or Firm*—Jacques M. Dulin; Heller, Ehrman, White & McAuliffe

[57] ABSTRACT

Modular sensor console unit for automotive occupancy sensors comprising an exterior housing having a grille and warning light bezel therein, a sensor mounting plate, an electronics module and a back cover having tabs for mounting on the interior of a vehicle, preferably adjacent the junction of the headliner and front windshield. The housing has an attractive contoured shape that merges to the headliner. The mounting plate comprises a plate and a plurality of hollow cones formed therein, preferably base down with the distal ends of the cones truncated to form planar openings for receivingly engaging US or IR sensors. The mounting plate can be employed in a first base-down "mesa" orientation with exposed sensors, or a base-up "magaphone" orientation with recessed sensors. The console can be pre-assembled and is easily mountable in the vehicle during interior finishing assembly.

20 Claims, 8 Drawing Sheets

Fig_2

Fig_3

Fig_5

Fig-7

Fig_8

MODULAR SENSOR UNIT CONSOLE

CROSS REFERENCE TO RELATED APPLICATION

This is the regular U.S. application of my prior provisional application Ser. No. 60/011,273 filed Feb. 7, 1996 titled MODULAR SENSOR UNIT, the benefit of the filing date of which is claimed under 35 U.S.C. §119(e).

TECHNICAL FIELD

The invention relates to a sensor unit assembly for an automotive occupancy sensor having modular features including the provision for accepting a wide variety of PC boards and sensor mounting boards within the assembly housing. The sensor unit is conveniently mounted in the headliner of a vehicle adjacent the front windshield, and normally along the fore-aft axis of the vehicle, that is, above the rearview mirror in the headliner. Alternately, it may be mounted in the headliner on the centerline of the passenger seat or in the A pillar.

BACKGROUND ART

The need for automotive occupancy sensor systems are set forth in detail in Corrado et al U.S. Pat. No. 5,482,314 which is incorporated by reference herein by way of background. Briefly, the incidents of injury by airbags to infants in rear facing child seats placed in the front passenger seat and to smaller occupants, such as young children and small or elderly adults is well documented. Proposed solutions include sensor systems that can discern the nature and location of occupants in passenger seats, or the absence of passengers, and in preselected scenarios signal the airbag deployment controller to not deploy the airbag. Alternately, airbags can be deployed partially, incrementally, or slowly, or a combination thereof; these are so-called "smart airbag" systems.

Critical to effective operations of such occupancy sensor systems are the suite of sensors. The sensors may be selected from one or more ultrasound (US), infrared (IR), capacitance, weight, inductance, visual (video) or other types of sensors. The sensors are very sensitive, must be tuned to the particular vehicle passenger compartment, and their output signals processed via algorithms for recognition of the nature and location of the occupant. Examples of such algorithms are set forth in the aforesaid Corrado et al U.S. Pat. No. 5,482,314 and copending application Ser. No. 08/731,355 filed Oct. 11, 1996 entitled Automotive Occupant Sensor System and Method of Operation By Sensor Fusion.

The sensors must be inexpensive, yet rugged, as vehicle operating conditions are varied and can be extreme. In addition, they need to be reasonably accessible for servicing or replacement. In addition, the sensor suite must be easy to mount during vehicle assembly, low cost, and reliable. Preferably, the sensors and related electronics should be grouped and provided as a subassembly by a specialty manufacturer.

SUMMARY

It is among the objects and advantages of the invention to provide a modular console assembly in or on which a plurality of sensors, preferably different kinds of sensors, can be preassembled thereon for installation of the module complete with sensors and electronics in one or more kinds or models of vehicles in one or more positions. It is another object and advantage of the invention to provide a console having special cone members on which sensors are mounted which enhance sensor sensitivity and operation, and/or reduce interference. It is another object and advantage to provide a sensor mounting console that is rugged, easy to manufacture and provides mounting means permitting quick and easy mounting of sensors thereon and ease of access thereto for servicing and change of sensors or electronics to accommodate operation in different vehicles or models of a given vehicle or manufacturer. Other objects are discernable in the various descriptions and drawings.

The modular sensor unit of the invention comprises a multi-component assembly including a housing, an optional grille, a sensor mounting plate, an electronics module and a mounting cover. In profile, the housing is contoured to conform to the surface profile of the headliner of the interior of the particular vehicle. The housing preferably has an attractive, contoured streamlined shape that can be highly and recognizably distinctive. Mounted in the sensor unit assembly housing are a modular sensor mounting plate and a modular electronics module. These are covered by a universal cover which has mounting tabs which are engaged by mounting clips in the bracket extending upwardly from the cross piece or clip which frames the upper window opening in the vehicle roof. The windshield is conventionally secured in the windshield opening via an appropriate gasket and mounting strip assembly.

The entire unit may be mounted in a variety of locations to which the sensors are tuned or adapted. A principal position is adjacent the fore-aft centerline of the vehicle, with the sensor mounting plate presenting the sensors on or in mounting cones angled so the sensors "look at" appropriate zones of the passenger seat and/or back. In an important alternative embodiment the module is mountable along the centerline of the passenger seat. In this instance the module can be mounted at the headliner junction with the windshield, in which case an apertured or split sun visor is preferably employed. Any other suitable location for the console may be employed, such as at the A-pillar headliner junction, on the windshield, at the juncture of the windshield and the dashboard, or on or in the dash.

It is another aspect of the invention that the sensors are mountable on a special reversible mounting plate, either recessed on the inside of a focusing cone (herein "base up" orientation) or mounted on the truncated top surface of an inverted cone (herein "base down" orientation). Where the cones have a large enough aperture for the particular sensor, situating each sensor in the truncated bottom of its individual a base-up cone isolates the sensors and collimates them for a clean look at the zones to which they are dedicated to observe, and reduces certain types of interference.

The mounting plate can be flipped over for mounting the sensors exposed on the top of the now base down cone. This is the presently preferred orientation. The cones are truncated to permit mounting the sensor thereon and should be spaced far enough apart to reduce or eliminate reflection interference off the sidewalls (shoulders) of adjacent cones. In this orientation the sensors can perform better, eliminating the possibility of sidewall reflection. Thus, the invention includes alternative mounting plate orientations, a recessed base up "megaphone" orientation, or an exposed base-down "mesa" orientation.

The sensor mounting plate and the electronics module may be specific to each vehicle, or may be semi-universal or fully universal. The sensor mounting plate is preferably a single plate which retains in proper position and angular orientation the various sensors, for example, multiple ultrasound and infrared sensors. The sensor mounting plate functions as a directional mount and need not be solid sheet material but could be a latticework, framework, plural individual cone, column or pyramid mounts, and the like. The sensor outputs are connected to the electronics module which contains the various circuitry, logic means such as ASICS, memory, diagnostic circuits or elements, and the like.

As with the sensor mounting plate, the electronics module may be specific to individual vehicles, or may be designed to cover a family or class of vehicles or generically all vehicles. These are secured in a well in the housing, and the cover member is then removably secured to the backside of the housing to enclose the sensor mounting plate and electronics module. The upper or back side of the cover has mounting tabs which are inserted in mounting clips in a bracket hidden behind the headliner in an appropriate position in the vehicle. Power, and both input and output signal connections are made through a receptacle on or in the cover. The housing also has a rearward facing window, visible from the vehicle interior, in which a warning bezel is mounted. Typically, the warning is wording that indicates the airbag has been disabled, turned off, or the like. The cover contains a recess and aperture for receivingly engaging a push-in bulb to illuminate the warning bezel of the housing.

The sensors look through a grille which is preferably an integral part of the housing. However, as an alternative, a separate drop-in grille plate may be provided to protect the active faces of the sensors. The grille aperture size and shape should be tuned to the sensors so that the grille does not introduce excessive interference. Grille interference can be compensated for in the signal processing electronics, but should be kept to a minimum or eliminated, where possible.

DRAWINGS

The invention is illustrated by reference to the accompanying drawings in which.

BEST MODE FOR CARRYING OUT THE INVENTION

The following detailed description illustrates the invention by way of example, not by way of limitation of the principles of the invention. The description will clearly enable one skilled in the art to make and use the invention, and describes several embodiments, adaptations, variations, alternatives and uses of the invention, including what is presently believed is the best mode of carrying out the invention.

Figure 1:
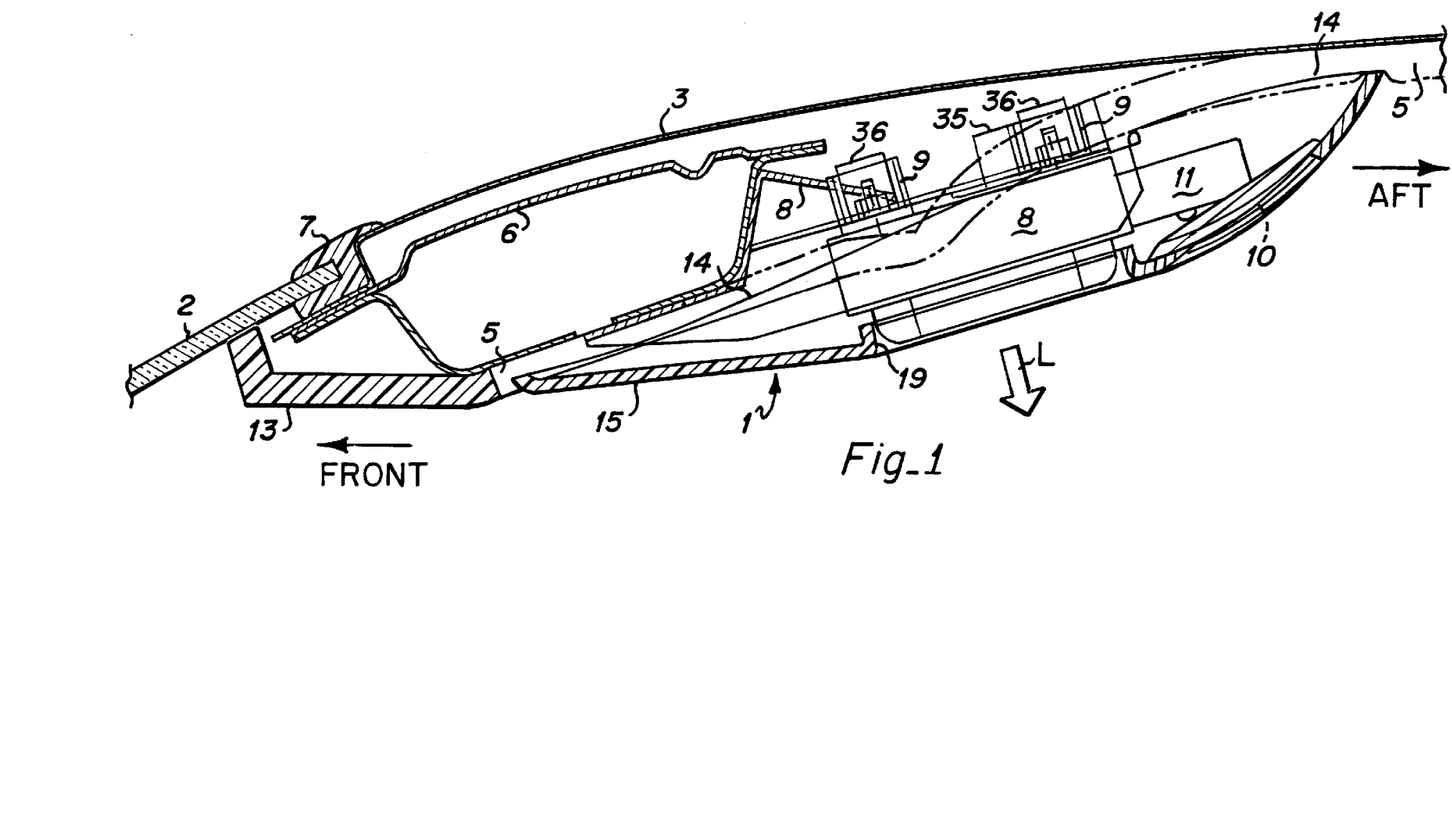
FIG. 1 is a section view of the sensor unit assembly of this invention mounted in place in the vehicle at the juncture of the headliner and windshield.

FIG. 1 shows the sensor unit assembly 1 of this invention mounted to the headliner 5 of an automotive interior 12 adjacent the juncture of the roof 3 with the windshield 2. A bracket extending from crossbeam or member 6 contains mounting clips 9 to which the cover element 8 of the assembly 1 is secured. The cover 8 also includes a bulb-holding portion 11 which illuminates a warning bezel 10. the forward end of the headliner may terminate in trim piece 13.

Figure 2:
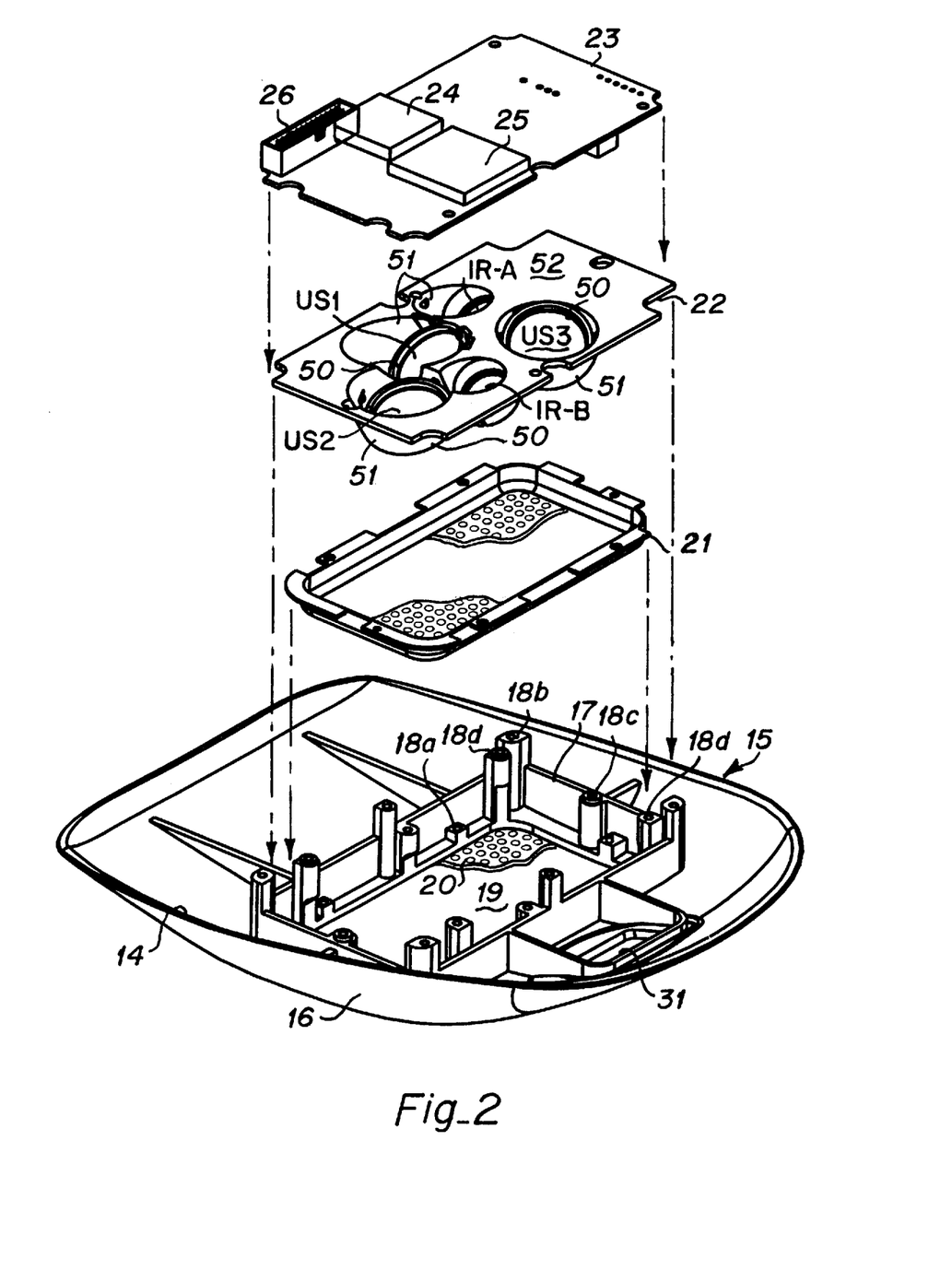
FIG. 2 is an exploded view of the sensor assembly absent the internal cover.
Figure 3:
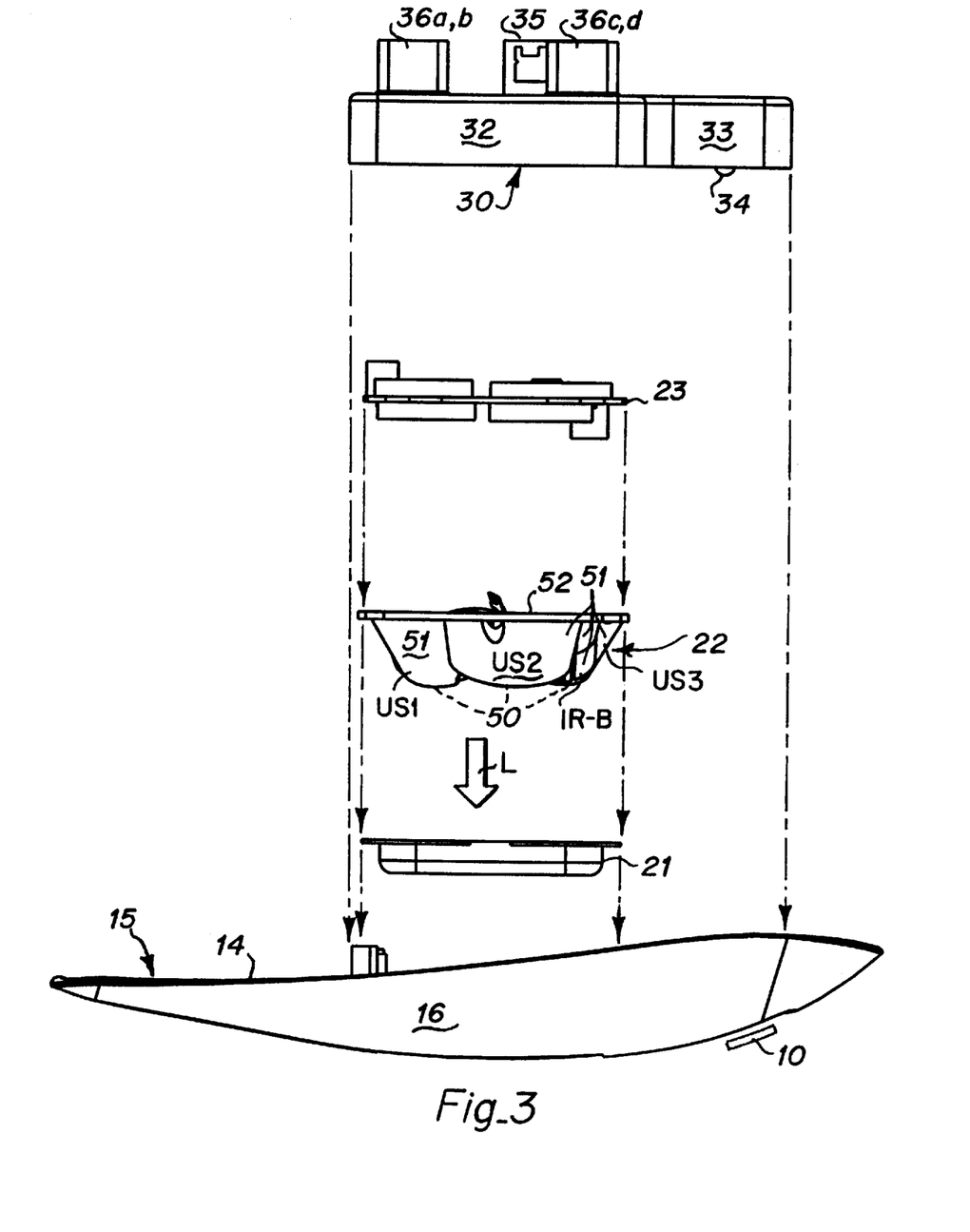
FIG. 3 is an exploded side elevation view of the sensor unit assembly of this invention including the internal cover unit and showing the mounting tabs.

FIG. 2 is an exploded isometric view of the sensor unit assembly of this invention, except that it does not include the cover which is shown in FIG. 3. the assembly comprises a shell housing 15 which is contoured on its exterior face 16 and edge 14 to provide a pleasing appearance. It includes a unitary, molded, internal, generally rectangular receptacle 17 having a plurality of screw posts 18 of various heights to receive the various subassemblies that fit therein. Sensor window 19 preferably has an integrally molded grille 20, or may be an opening to receive a drop-in-grille unit 21. The grille has an array of holes therein through which the ultrasound sensor beam can be emitted and the return received, and the infrared waves received by the IR sensors. The optical drop-in grille 21 may be fastened by appropriate fasteners to the screw posts 18a. The fasteners are not shown but are conventional.

Figure 5:
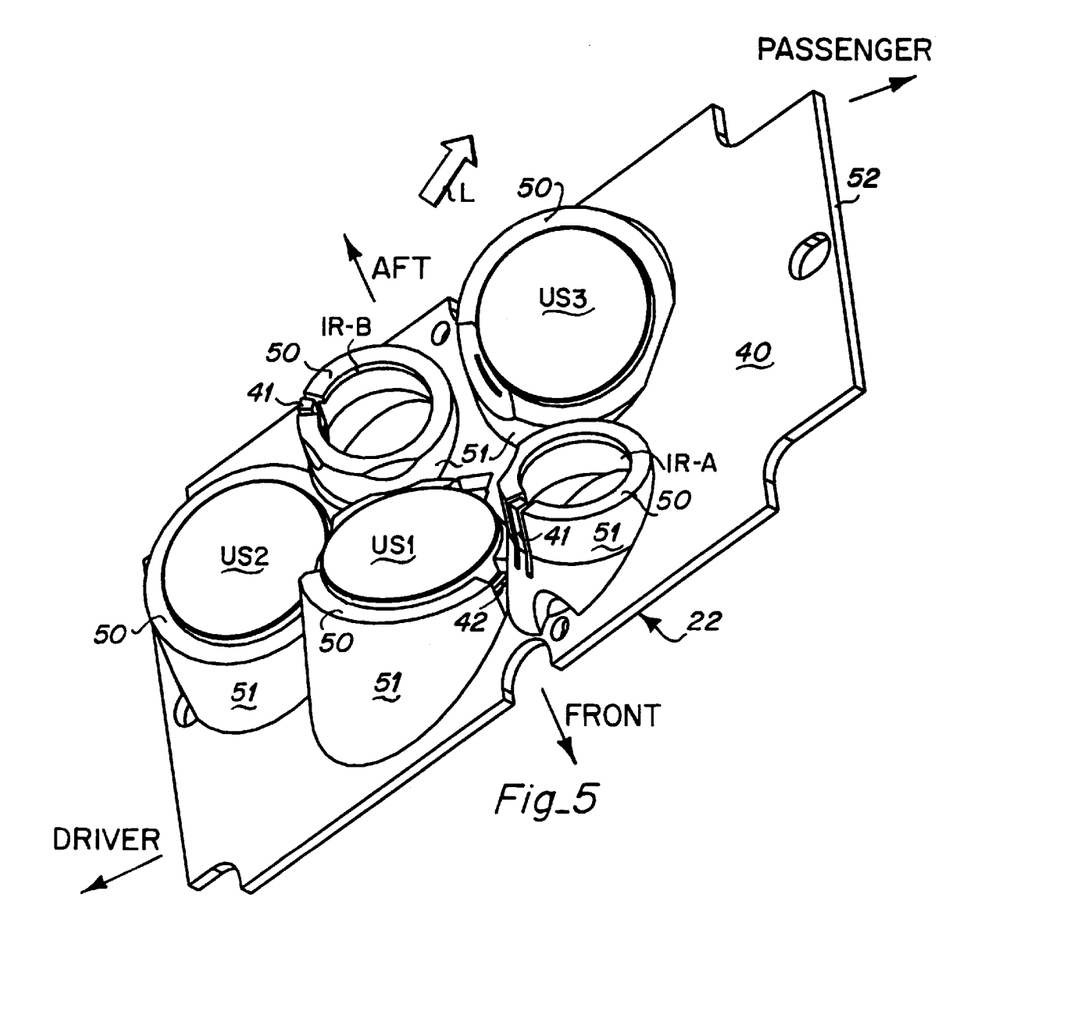
FIG. 5 is an enlarged isometric view of the sensor mounting plate with three ultrasound sensors mounted therein, the view shown being the side facing the interior of the vehicle with the passenger side being toward the upper right.
Figure 6:
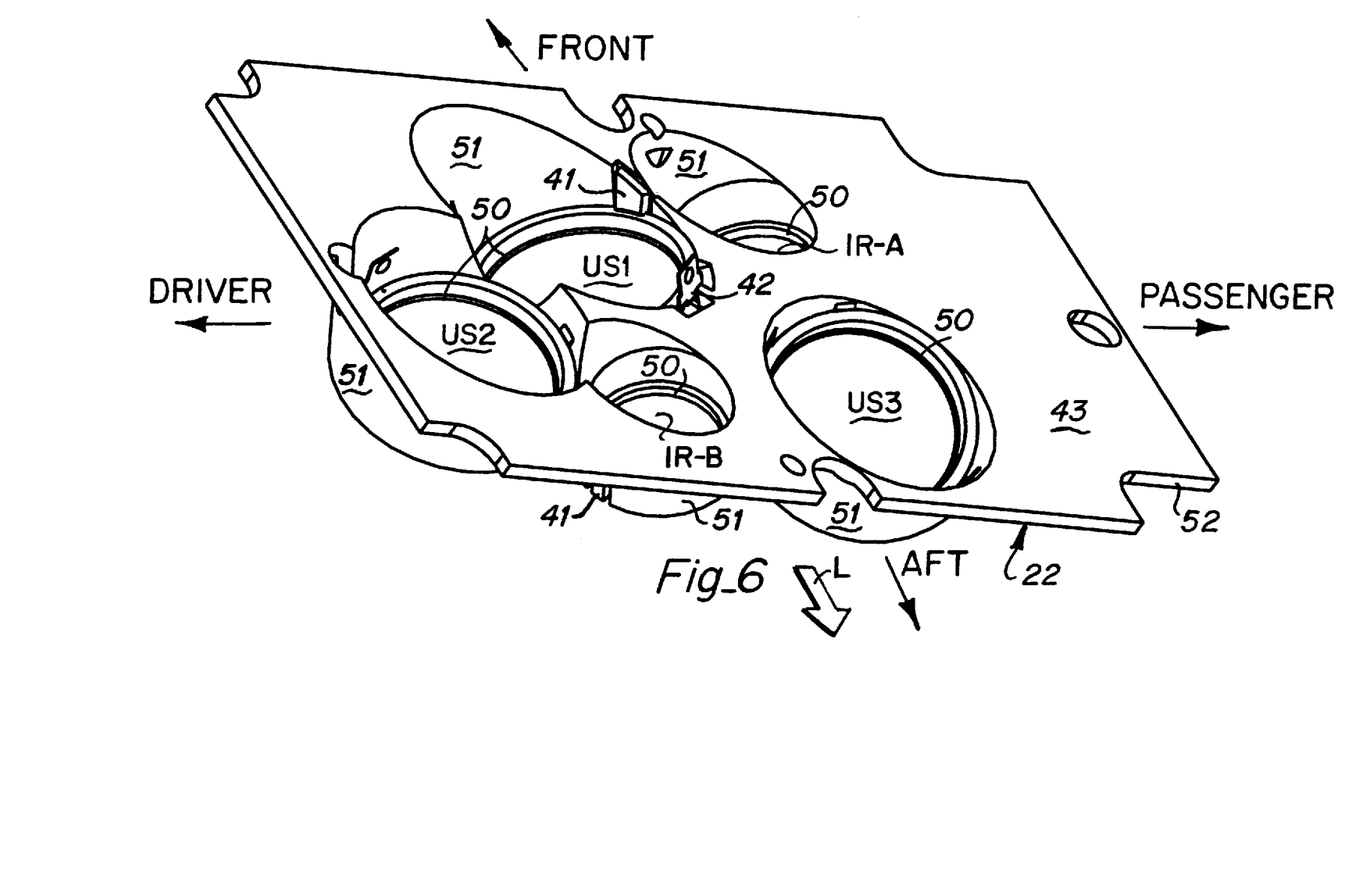
FIG. 6 is the obverse side of the sensor mounting plate of FIG. 5 with the passenger side being to the right.

The sensor mounting plate 22 is then placed to overlie the grille. It contains a number of conical projections onto or into which the infrared and ultrasound sensors are mounted. Note that as seen in FIGS. 2 and 6 the sensor mounting plate 22 is upside down, and the sensors are mounted on the top truncated plane 50 of the base-down cones 51. Since plate 22 is viewed from the back side in FIGS. 2 and 6, the cones appear to be base up, but in fact they are base down relative to the plane 52 of the plate 22. This is best seen in FIG. 5. See also FIG. 6, wherein the arrow L is the direction in which sensors look at the target space or surface in the vehicle interior.

It should be noted that comparing FIGS. 5 and 6 shows the two orientations of the sensor mounting plate. Assuming the position of the viewer of those figures is that of a passenger, i.e. a view from the interior of the vehicle, FIG. 5 would represent the base down "mesa" orientation with exposed sensors. FIG. 6 would represent the base up recessed, "megaphone" orientation. Of course, the sensor faces would face the viewer in each view in order to be operable. The FIG. 6 orientation requires the cone angle to be wide enough to substantially eliminate or minimize side wall reflection-type interference. While the −6 db (half power point) is ordinarily used to determine appropriate cone angles, a 99 percentile power point is preferred to effectively eliminate all side wall reflections. The FIG. 5 orientation requires the shoulders of adjacent cones to not cross sight lines of other sensors to substantially eliminate shoulder reflections.

The sensors shown are the ultrasound sensors 1, 2 and 3 (US1, US2 and US3), and the two infrared sensors (IR-A and IR-B). The plate 22 is mounted to the screw posts 18c with appropriate fasteners. The ultrasound and infrared sensors are mounted to the top face apertures 50 of the cone mounts 51. As best seen in FIG. 5, the mount may be geometrically described as base-down frusto-conical surfaces having open truncated ends. The cones 51 are formed in the plate with the cone axis looking at the appropriate zone (arrow L) of the passenger seat. The cones 51 are tilted with respect to the plane of plate 52 and merge into it as shown in FIGS. 5 and 6.

Thereafter, the electronics module 23 is mounted to the posts 18d. The electronics module contains the various electronics as set forth in the above-identified U.S. Pat. No. 5,482,314 and may include a variety of circuits on a PC board, various chips, memory modules, ASICS and the like 24, 25. An optional connector 26 for diagnostics may also be included.

FIG. 3 is an exploded side elevation view of the assembly shown in FIG. 2. This view includes the cover 30 as well as the optional sensor grille 21. The numbers described above remain the same. Note the location of the bezel 10 which is a transparent or translucent plastic piece glued to the bezel opening 31 as best shown in FIG. 2. The cover 30 includes a main housing portion 32 which is screwed to the post 18b as shown in FIG. 2, and a bulb receptacle portion 33 housing the bulb 34 for illuminating the warning bezel 10. In addition, the cover 30 includes a receptacle for input and output of signals to and from the sensor unit. The cover 30 is secured to the housing 15 with the sensor mounting plate and electronics module secured therein to form a total assembly. The power and signals are input/output through connector 35, and the tabs 36a, b, 36c, d are pushed into the clips 9 (see FIG. 1) to secure the senor unit assembly in the proper position in the headliner.

Figure 4:
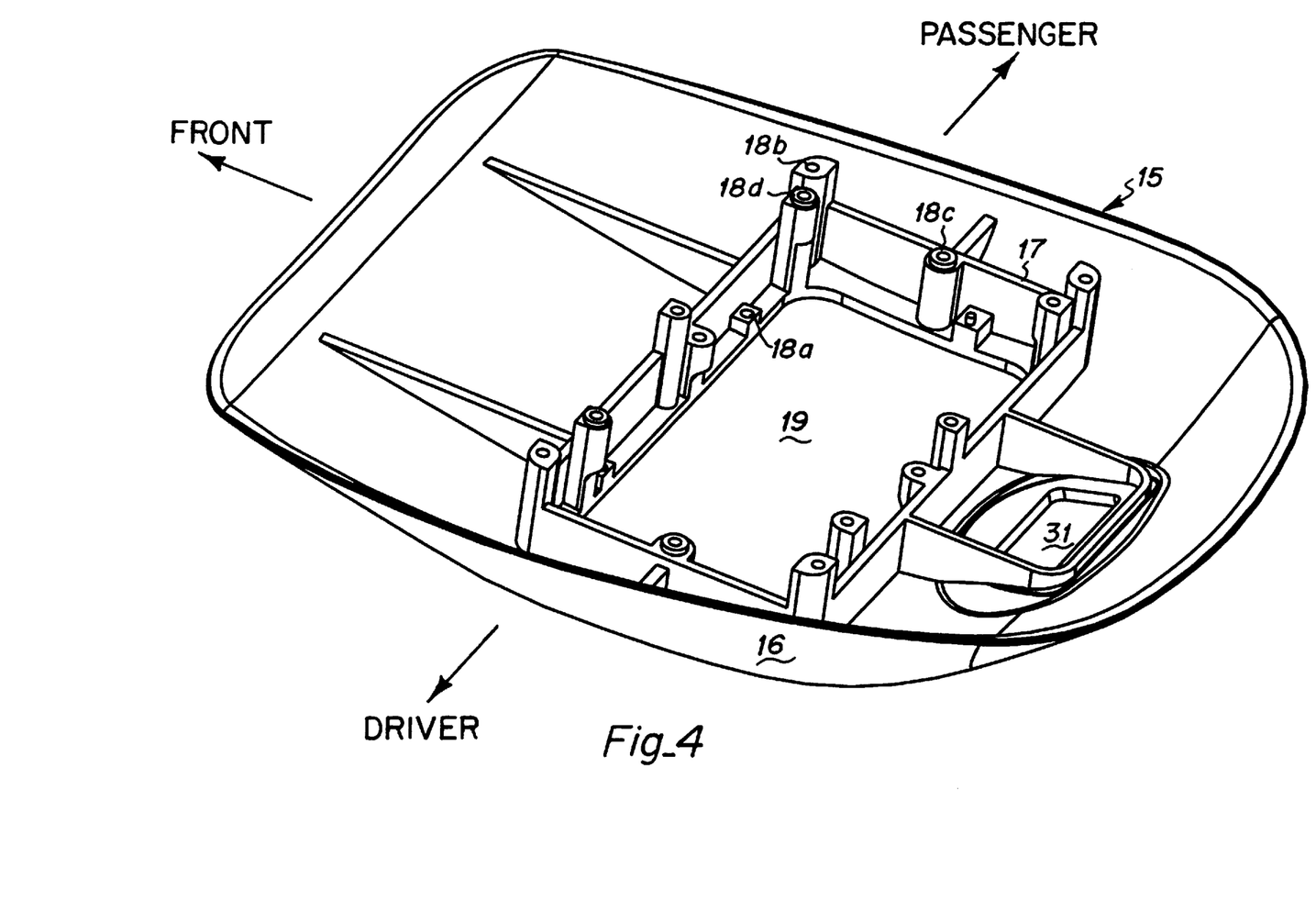
FIG. 4 is an enlarged isometric projection of the housing.

FIG. 4 is an enlarged view of the housing 15 showing the various elements described above. The orientation arrows show the mounting position of the assembly in the vehicle, with the front toward the upper left, the driver's side is down and toward the left, and the passenger side is up and toward the right.

FIG. 5 shows the preferred "mesa" orientation for the sensor cones. It shows the vehicle interior-facing side 40 of the sensor mounting plate 22 and the plurality of frosto-conical projections 51 thereon for retiringly engaging the ultrasound sensors 1, 2 and 3 and the infrared sensors IR-A and IR-B, as identified above on the truncated faces 50 of the cones. The ultrasound sensors are shown mounted from the obverse (back) side (shown in FIG. 6) while the IR sensors are not mounted in this view. The IR sensor cones show spring based side fingers or clips 41 to secure the sensors in place. Element 42 is exemplary of a connector tab on one of the electrical contacts for an ultrasound sensor.

FIG. 6 shows the obverse side 42 (back side) of the preferred orientation of the sensor mounting plate 22 with the mounting cones being clearly evident in bottom up orientation. The sensors are dropped in from this side during assembly, and secured in place by the spring clips 41. As seen in FIG. 5, they project above the surface of the code face 50 to provide the improved performance. A comparison of FIG. 5 and 6, and the general orientation during assembly shown in FIGS. 2 and 3, illustrate that the angled planes of the face openings 50 of the various cones 51, and the angular orientation of the axes of the cones with respect to the plate 52 and plate 40, permit the various sensors to look at the appropriate zones of the passenger seat and its surroundings. The zones are set forth in the aforesaid U.S. Pat. No. 5,482,314 by way of example.

Figure 7:
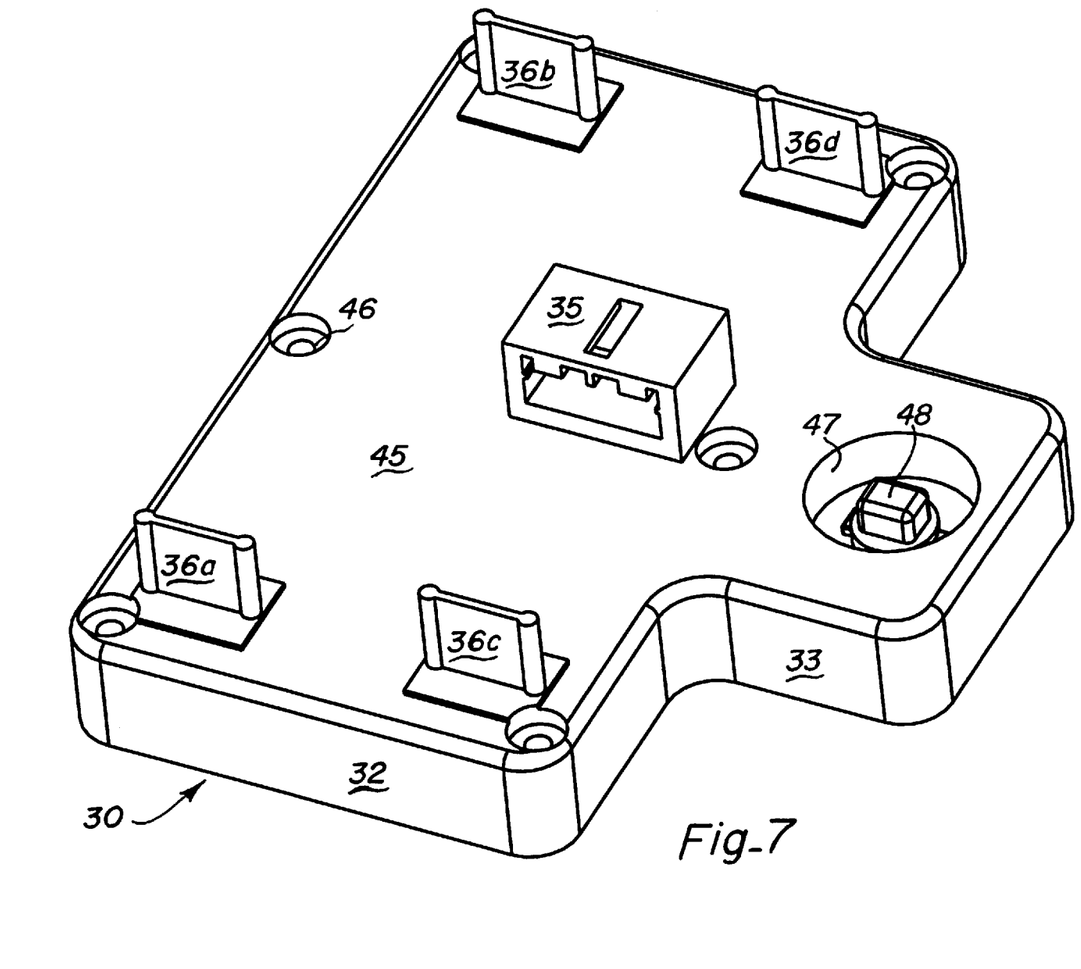
FIG. 7 is an isometric view of the sensor unit internal cover showing the mounting tabs, the power and signal lead connector, and the bulb mount receptacle, the view shown being that of the external or top mounting side.

FIG. 7 shows the exterior or mounting side of the cover 30 which is secured to the receptacle 17 of the housing 15 by screws or other fasteners passing through bosses 46 to posts 18b. The main housing section 32 covers the electronics module and the sensor mounting plate, while the bulb receptacle portion 33 provides a boss 47 for receiving a bulb receptacle 48 and to which the bulb 34 is mounted to illuminate the warning bezel 10. The connector 35 (described above) is shown on this face. In addition, the mounting tabs 36a, b, c, d are shown. These are pushed into the receiving clips 9 in the bracket in the headliner of the vehicle.

Figure 8:
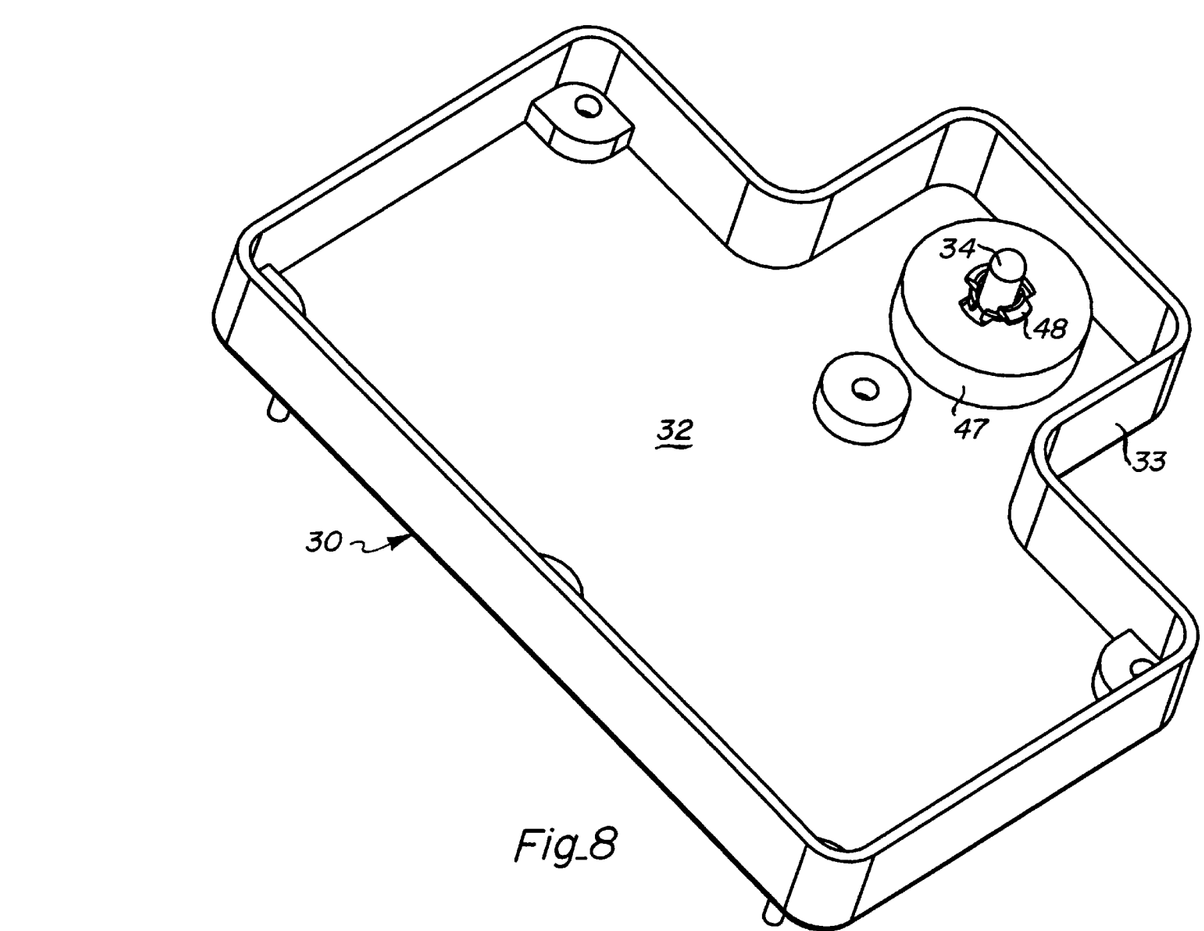
FIG. 8 shows the obverse interior view of the cover of FIG. 7 with the bulb in place.

FIG. 8 shows the interior side of the cover with the main housing portion 32 and the bulb receptacle portion 33 being defined as shown. The light bulb boss or recess 47 is shown with the light bulb receptacle 48 and bulb 34 mounted therein.

INDUSTRIAL APPLICABILITY

The sensor unit assembly shown herein has extensive industrial applicability. For example, the unit shown is an early prototype for a pickup truck. Generally, the housing 15 will be relatively distinctive and the cover 30 will be generic. The preferred example, the grille 20 will be integral with the housing 15, but various decorative grilles 21 may be used. The grille apertures must be tuned (sized, shaped and oriented) for the particular sensor for best (non-interfering) operation. Typically, the unit is made of a durable plastic, including the housing 15, the grille 20 or 21 in order to be transparent to the sensor signals, the sensor mounting plate 22 and the cover 30 for injection molding. The electronics module may vary from unit to unit. In addition, the particular frusto-conical sensor mount cones and their directional orientation (angle of axis relative to the plane of the plate), size, length, number and arrangement may be varied to suit specific vehicles. The sensor mounting plate and electronics board are drop-in subassemblies for this modular sensor unit assembly. The cover 30 can be relatively standard, although the specific number and location of the tabs 36 may be varied to suit the individual bracket requirements of individual vehicles.

It should be understood that various modifications within the scope of this invention can be made by one of ordinary skill in the art without departing from the spirit thereof. The invention is to be defined by the scope of the appended claims as broadly as the prior art will permit, and in view of the specification if need be.

I claim:

1. A modular automotive occupancy sensor console unit comprising:
   (a) a contoured concave housing shell for attachment in a vehicle interior adjacent the juncture of a windshield and an interior headliner, said shell having a smooth exterior surface and an interior;
   (b) means in the interior of said housing for receivingly engaging a sensor plate, an electronic module and a cover;
   (c) a cover for said sensor plate and electronics unit;
   (d) means for removably mounting said automotive occupancy sensor console unit in association with the headliner of said vehicle.

2. A modular automotive occupancy sensor console as in claim 1 which includes:
   (a) a sensor mounting plate to which a plurality of IR and/or ultrasound sensors can be mounted;
   (b) an electronics unit; and
   (c) said sensor mounting plate and said electronics unit being adapted to be securable in said housing.

3. A modular automotive occupancy sensor console as in claim 1 which includes:

(a) a warning bezel in said housing; and (b) means for illuminating said bezel.

4. A modular automotive occupancy sensor console as in claim 2 which includes:

(a) a warning bezel in said housing; and (b) means for illuminating said bezel.

5. A modular automotive occupancy sensor console as in claim 1 wherein said automotive occupancy sensor unit mounting means of element d in claim 1 includes a plurality of mounting tabs projecting from said cover.

6. A mount for ultrasound or infra red sensors comprising:

(a) a generally planar member;

(b) at least one hollow cone projecting from said planar member;

(c) said cone being oriented with its base secured to said planar member, and having a central axis angled at a desired field of view relative to the plane of said planar member;

(d) said cone terminating in a top plane distal from said planar member and having an opening therein;

(e) a sensor mounted in said cone opening in either a recessed orientation or an exposed orientation projecting above said top plane.

7. A mount as in claim 6 wherein said sensor is an ultrasound sensor.

8. A mount as in claim 6 wherein said sensor is an infra red sensor.

9. A mount as in claim 7 wherein said sensor is an infra red sensor.

10. A mount as in claim 6 which includes a plurality of cones, each of which includes means for receivingly engaging a single ultrasound and/or infra red sensor; and each cone has a central axis directed to a preselected field of view zone so that collectively the zones provide substantially abutting edge-to-edge coverage of a preselected target area.

11. A mount as in claim 6 wherein said sensor is mounted in said exposed orientation.

12. A mount as in claim 10 wherein said sensor is mounted in said exposed orientation.

13. A method of improving the performance of ultrasound and/or infra red sensors comprising:

(a) providing a generally conical, cylindrical or pyramidal mount member having a proximal base end and a distal sensor-receiving end;

(b) terminating the distal end substantially in a plane having an aperture therein for receiving at least one ultrasound and/or infra red sensor; and (c) mounting said ultrasound and/or infra red sensor in said aperture of said mount member with a transmitting and/or receiving surface thereof in either a first exposed orientation projecting above said distal plane to substantially eliminate shoulder reflection, or in a second, recessed orientation with said cone being apertured sufficiently to eliminate side wall reflection.

14. A method as in claim 13 wherein said sensor is an ultrasound sensor.

15. A method as in claim 13 wherein said sensor is an infra red sensor.

16. A method as in claim 14 wherein said sensor is an infra red sensor.

17. A method as in claim 13 which includes means for receivingly engaging a single ultrasound and/or infra red sensor; and each cone has a central axis directed to a preselected field of view zone so that collectively the zones provide substantially abutting edge-to-edge coverage of a preselected target area.

18. A method as in claim 13 wherein said orientation is said exposed orientation.

19. A method as in claim 13 wherein orientation is said recessed orientation and said cone angular aperture is at the approximately 99 percentile power point.

20. A modular automotive occupancy sensor console as in claim 1 wherein said housing shell and said means for removably mounting said console is adapted to be mounted adjacent the fore/aft center line of said passenger seat.

* * * * *